United States Patent [19]

Karita et al.

[11] Patent Number: 4,908,533
[45] Date of Patent: Mar. 13, 1990

[54] TRANSPORTING APPARATUS

[75] Inventors: Mitsuji Karita; Tsutomu Shinya; Tetsuo Oishi, all of Ise, Japan

[73] Assignee: Shinko Electric Co., Ltd., Tokyo, Japan

[21] Appl. No.: 144,234

[22] Filed: Jan. 15, 1988

[51] Int. Cl.[4] .............................................. H02K 41/03
[52] U.S. Cl. ........................................ 310/12; 318/135
[58] Field of Search ...................... 310/12, 13, 14, 154, 310/156; 318/135

[56] References Cited

U.S. PATENT DOCUMENTS 3,858,522 1/1975 Maki ...................................... 310/12
4,563,602 1/1986 Nagasaka ........................... 310/49 R
4,728,830 3/1988 Gamble ................................ 310/154

FOREIGN PATENT DOCUMENTS

0059063 4/1984 Japan ..................................... 310/12

Primary Examiner—Peter S. Wong
Assistant Examiner—Judson H. Jones
Attorney, Agent, or Firm—Cushman, Darby & Cushman

[57] ABSTRACT

A transporting apparatus using a linear motor comprises at least a primary unit and a secondary unit. The primary unit faces the secondary unit with a predetermined gap. The primary unit consists of a core and coils supplied with three-phase alternating currents so that the primary unit generates a progressive magnetic field. The secondary unit at least includes a core and permanent magnets. These permanent magnets are magnetized so that each section of the secondary unit is magnetized in a north pole and a south pole in turn along a longtitudinal direction thereof. Hence, the primary unit can be transported along the secondary unit by controlling the currents supplied to the primary unit.

8 Claims, 9 Drawing Sheets

TRANSPORTING APPARATUS

BACKGROUND OF THE INVENTION

1. Field of the Invention

The present invention generally relates to a transporting apparatus, and more particularly to a transporting apparatus using a linear motor which directly converts an electric energy into a linear mechanical energy.

2. Prior Art

Figure 1A:
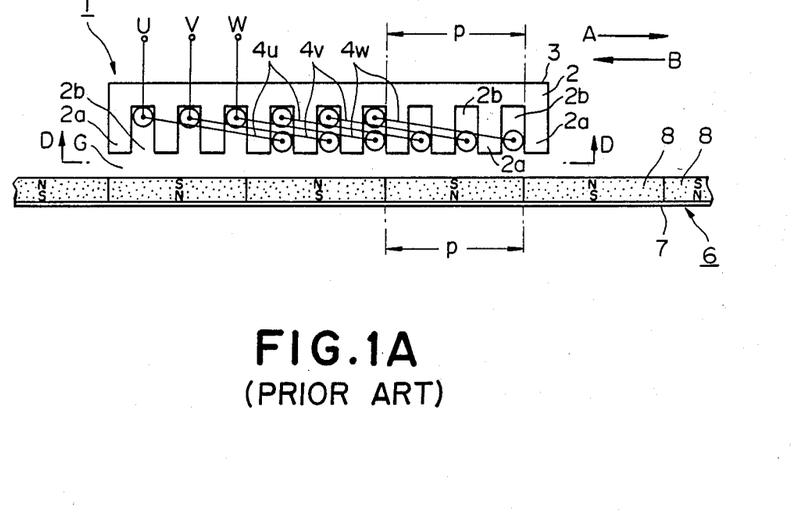
FIG. 1A shows a construction of the conventional linear motor.
Figure 1B:
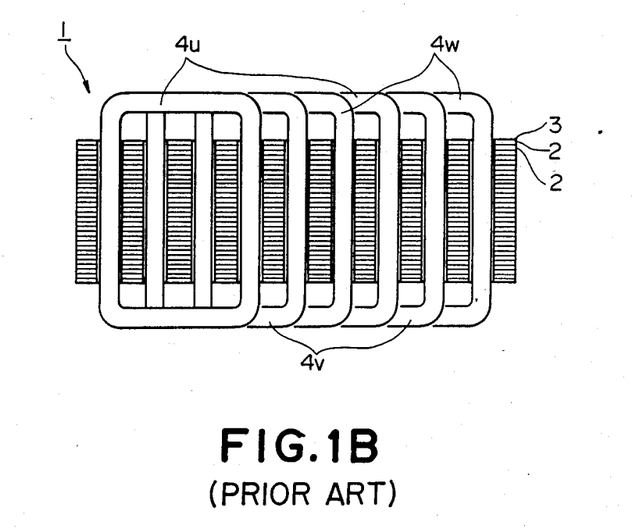
FIG. 1B is a fragmentary view of the linear motor shown in FIG. 1A taken along line D—D.

Conventionally, a linear motor as shown in FIGS. 1A and 1B is known as a linear motor having a construction of a linearly developed permanent magnet type synchronous motor. In FIGS. 1A and 1B, a primary unit 1 consists of a primary core 3 having a layer construction which is constructed by a plurality of electric iron plates. Each electric iron plate 2 has teeth 2a and channels 2b. In addition, each of three coils 4u, 4v and 4w is winding at each channel 2b. When three-phase alternating currents are supplied to the coils 4u, 4v and 4w, the primary unit 1 generates a progressive magnetic field which progresses in a direction A or B. A half wavelength (or a length of half cycle) of this progressive magnetic field is called a pole pitch p in particular.

Meanwhile, 6 designates a secondary unit which faces the primary unit 1 with a gap G. This secondary unit 6 is constructed so that a plurality of permanent magnets 8 can be disposed on a long base plate 7. The length of each permanent magnet 8 is set equal to the pole pitch p. These permanent magnets 8 are disposed so that the north (N) pole and the south (S) pole of the permanent magnets 8 can face the primary unit 1 in turn. In addition, a supporting mechanism (not shown) keeps the gap G between the primary unit 1 and the secondary unit 6 constant. Due to this supporting mechanism, the primary unit 1 can be freely moved in the direction A or B. For example, when the primary unit 1 is fixed at a certain position and the three-phase alternating currents are supplied to the coils 4u, 4v and 4w, the secondary unit 6 can move in the direction A or B in synchronism with a moving speed of the progressive magnetic field generated by the primary unit 1 based on an operating principle of the permanent magnet type synchronous motor. Similarly, when the secondary unit 6 is fixed instead of the primary unit 1, the primary unit 1 can move in the direction A or B.

In order to obtain an efficient thrust power of the linear motor having the above-mentioned construction, it is required to increase a magnetic flux density generated by the permanent magnets 8 of the secondary unit 6. However, the permanent magnets 8 are arranged adjacently in the conventional linear motor. Hence, the conventional linear motor is disadvantageous in that a rare earth magnet having a high price must be used as each permanent magnet 8 in order to increase the magnetic flux density. In addition, magnetic pole planes of the permanent magnets 8 face the primary unit 1. Hence, when rush currents flow into the coils 4u, 4v and 4w, the magnetic fluxes generated from each tooth 2a of the primary core 3 must flow through the permanent magnets 8. Thus, the conventional linear motor is disadvantageous in that the permanent magnets 8 must be demagnetized.

Meanwhile, semiconductors are produced in a so-called "clean room" within a factory. Such clean room has a highly dustless condition. In order to produce the semiconductors, there are many processes for transporting wafers. In addition, transporting lines by which the wafers are transported includes vertical transporting lines so that the transporting lines are formed three-dimensionally. As an transporting apparatus used for the vertical transporting lines in particular, the following apparatuses are used conventionally.

(1) It is possible to employ a lifter which is driven by chains having a power source such as a hydraulic pressure source, air pressure source or a motor.

(2) It is possible to employ an electric truck which can be transported up and down by use of a motive power of a motor transferred thereto via rack and pinion.

Figure 2:
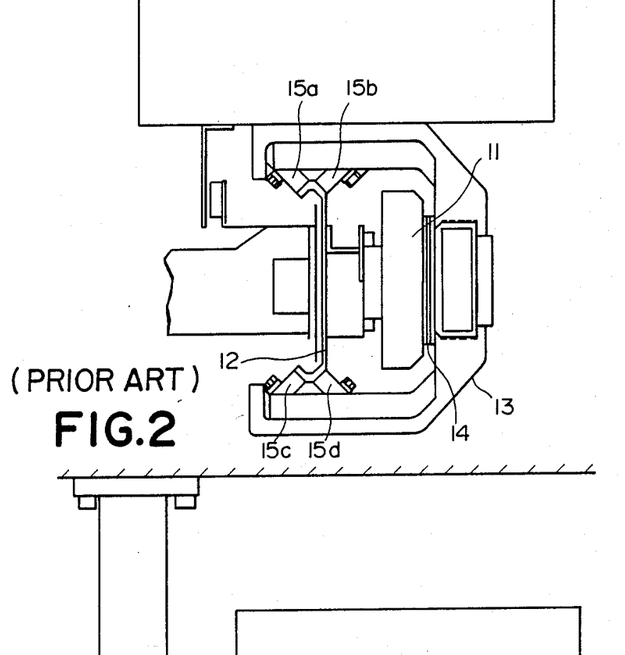
FIGS. 2 and 3 are respective sectional views each showing the construction of the conventional transporting apparatus using the linear motor.

(3) It is possible to employ a ground primary method of a linear motor as shown in FIG. 2. In FIG. 2, a primary unit 11 of a linear motor is put on a rail 12, and a secondary unit 14 is mounted to a transporting truck 13. This transporting truck 13 can be driven by the thrust power of the aboveconstructed linear motor by use of wheels 15a to 15d.

Figure 3:
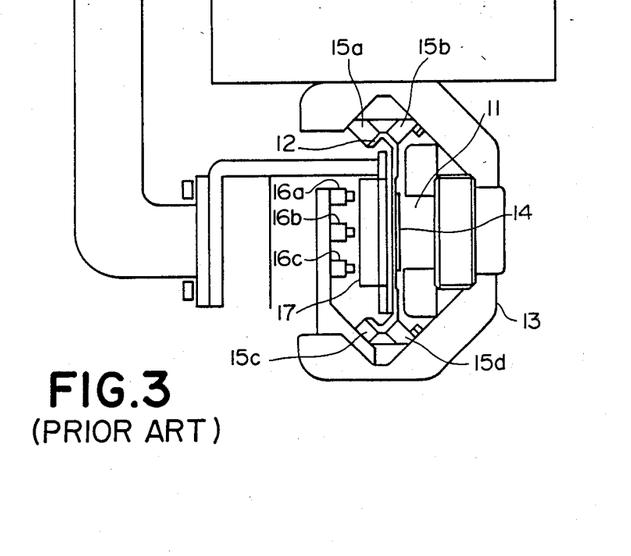

(4) It is possible to employ a ground secondary method of a linear motor as shown in FIG. 3. In FIG. 3, the primary unit 11 of the linear motor is mounted to the transporting truck 13, and the secondary unit 14 is put on the rail 12. In addition, a trolley rail 17 is mounted to the rail 12. According to such method, the three-phase alternating currents from the trolley rail 17 are supplied to the primary unit 11 via current collector brushes 16a to 16c, whereby the linear motor will be driven.

In the case where the lifter is employed as the transporting apparatus which is used in the highly dustless clean room within the semiconductor producing factory as described before, a contact portion must be formed in a mechanical portion such as the chain. Similarly, such contact portion is formed between the rack and the pinion of the electric truck. In addition, such contact portion is formed between the rail 12 and the wheels 15a to 15d shown in FIG. 2. In FIG. 3, such contact portion is formed between the rail 12 and the wheels 15a to 15d and between the trolley rail 17 and the current collector brushes 16a to 16c. Therefore, when the transporting truck having such contact portion is transported, the dust must be produced from the contact portion. In order to prevent such dust from being produced, a cover must be provided for the transporting apparatus. In addition, workers must take great care of an air flow in the clean room, and the workers must take great care of the dust so that the dust may not produce a bad effect on the wafer of the semiconductor.

SUMMARY OF THE INVENTION

It is a primary object of the invention to provide a transporting apparatus using the linear motor which can increase the density of the magnetic fluxes generated from the permanent magnets of the secondary unit but other magnetic fluxes generated from the primary unit do not demagnetize the permanent magnets of the secondary unit.

It is another object of the invention to provide a transporting apparatus which eliminates the contact portions so that the dust is not produced therefrom when the transporting truck thereof is running.

In a first aspect of the invention, there is provided a transporting apparatus using a linear motor comprising: (a) a primary unit for generating a progressive magnetic field; and (b) a secondary unit the predetermined plane of which faces a plane of the progressive magnetic field with a certain gap, the secondary unit comprising a plurality of permanent magnets and cores which are arranged in turn along a progressing direction of the progressive magnetic field, and the permanent magnets being magnetized such that planes of the cores facing the plane of the progressive magnetic field are magnetized in a north pole and a south pole in turn.

In a second aspect of the invention, there is provided a transporting apparatus using a linear motor comprising: (a) a pair of primary units each generating a progressive magnetic field; and (b) a secondary unit inserted between the primary units with certain gaps such that a predetermined plane of the secondary unit faces a plane of the progressive magnetic field generated by each primary unit with the certain gap, the secondary unit comprising a plurality of permanent magnets and cores which are arranged in turn along a progressing direction of the progressive magnetic field, and the permanent magnets being magnetized such that planes of the cores facing the plane of the progressive magnetic field are magnetized in a north pole and a south pole in turn.

In a third aspect of the invention, there is provided a transporting apparatus comprising: (a) a secondary unit of a linear motor, the secondary unit being magnetized by use of permanent magnets so that each section of the secondary unit is magnetized by a north pole and a south pole in turn along a longitudinal direction thereof, the linear motor having threedimensional transporting lines including vertical lines; (b) first and second primary units of the linear motor, each of the first and second primary units comprising a core and coils winding around the core, the secondary unit being inserted between the first and second primary units so that the core of the first primary unit is arranged opposite to that of the second primary unit with the secondary unit, the first and second primary units being linked together so as to construct a transporting truck of the linear motor; (c) gap detecting means for detecting first and second gaps each formed between the secondary unit and each of the first and second primary units; and (d) control means for controlling currents supplied to the coils of the first and second primary units so that the first gap is maintained identical to the second gap.

BRIEF DESCRIPTION OF THE DRAWINGS

Further objects and advantages of the present invention will be apparent from the following description, reference being had to the accompanying drawings wherein preferred embodiments of the present invention are clearly shown.

In the drawings.

DESCRIPTION OF THE PREFERRED EMBODIMENT

[A ] FIRST EMBODIMENT

Figure 4A:
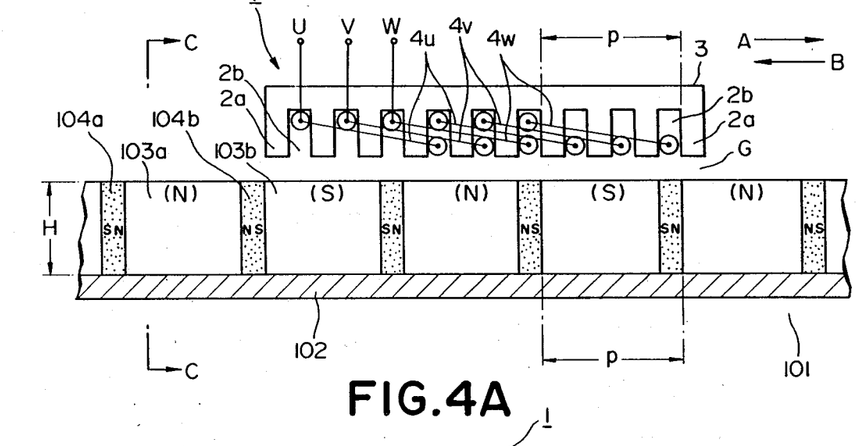
FIG. 4A shows a construction of a transporting apparatus according to a first embodiment of the present invention.
Figure 4B:
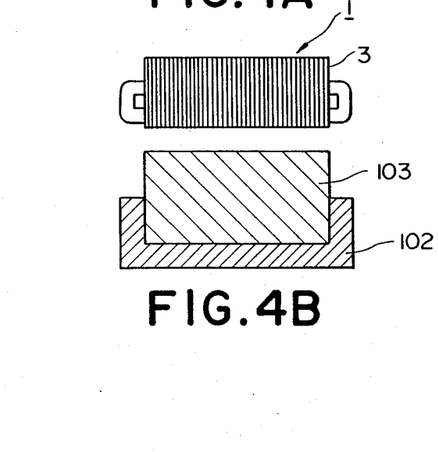
FIG. 4B a sectional view of the transporting apparatus shown in FIG. 4 along line C-C.

Next, description will be given with respect to a first embodiment of the present invention FIGS. 4A to 6. FIGS. 4A and 4B are respective views both showing the construction of the first embodiment. In FIGS. 4A and 4B, parts corresponding to those in FIGS. 1A and 1B are designated by the same numerals, and description thereof will be omitted.

In FIGS. 4A and 4B, 101 designates a secondary unit of the linear motor which consists of a frame body 102, square bar shaped secondary cores 103a, 103b, ... and plate shaped permanent magnets 104a, 104b, ... This frame body 102 made of non-magnetic materials such as aluminum materials, for example. The secondary cores 103 and the permanent magnets 104 are arranged on the frame body 102 in turn along a moving direction of the primary unit 1 or the secondary unit 101 (i.e., the direction A or B). In addition, each secondary core is sandwiched between the same poles of two permanent magnets. Hence, the planes of the secondary cores 103 facing the primary unit 1 are magnetized in the N pole and the S pole in turn. Further, the pole pitch p of the primary unit 1 is set identical to the length of one pair of the secondary core 103 and the permanent magnet 104 taken along the moving direction of the primary unit 1 or the secondary unit 101.

According to the first embodiment described heretofore, it is possible to enlarge a height H of each permanent magnet 104, i.e., the length H taken in a direction perpendicular to an edge plane of each tooth 2a where the magnetic field is generated. Hence, it is possible to increase the magnetic flux density by use of ferrite magnets having a low price, instead of using the rare earth magnets having a high price. In the case where the rush currents are flown through the coils 4u, 4v and 4w at a start timing, the magnetic flux generated from each tooth 2a of the primary core 3 passes through each secondary core 103. Hence, it is possible to prevent the permanent magnet 104 from being demagnetized.

Figure 5:
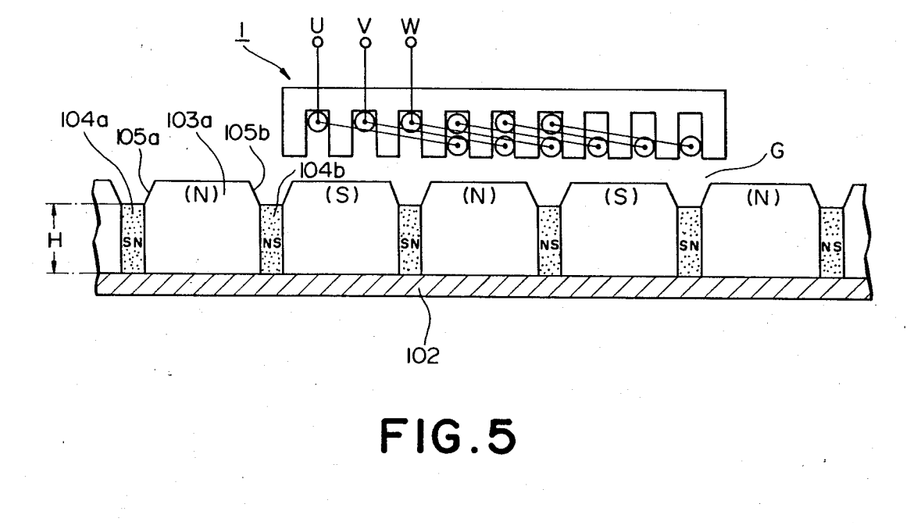
Figure 6:
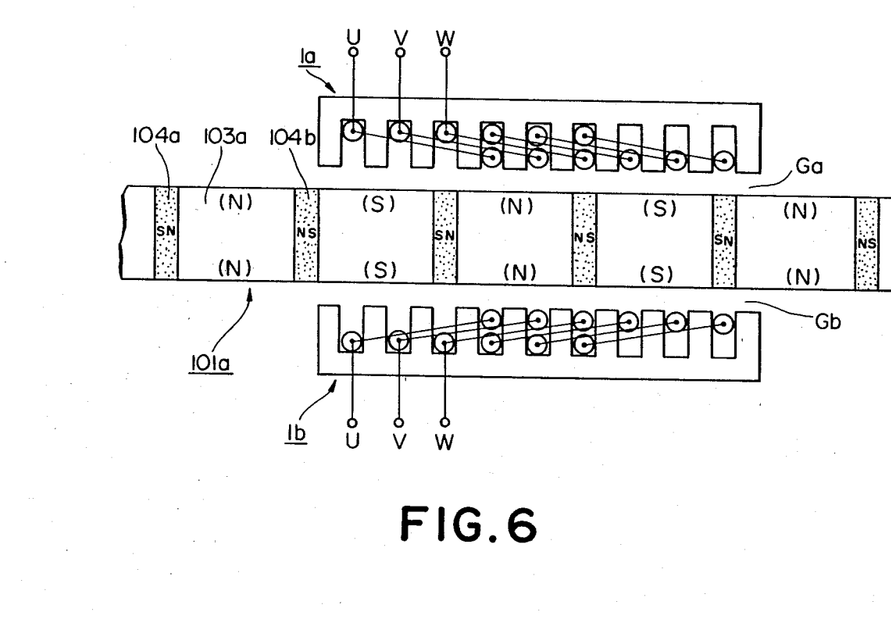
FIGS. 6 and 6 show other examples of the first embodiment shown in FIGS. 4A and 4B.

Next, FIGS. 5 and 6 respectively show other examples of the first embodiment.

First, differences between the above-mentioned first embodiment and the embodiment shown in FIG. 5 are that the height H of each permanent magnet 104 is set smaller than a height of each secondary core 103 and each secondary core 103 is re-formed so that slant faces 105a and 105b are formed at the corners thereof, instead of square corners thereof. Hence, a distributing waveform of the magnetic flux which is generated from each permanent magnet 104 and is spread into the gap G can be diagrammatically represented by a sine curve. Therefore, it is possible to reduce a so-called torque ripple and also stabilize a transporting operation of the transporting apparatus which is driven at a slow speed.

In another example shown in FIG. 6, the frame body 102 is removed from the secondary unit 101 shown in FIG. 4A so as to construct a secondary unit 101a, which is sandwiched between a pair of primary units 1a and 1b with respective gaps Ga and Gb. In addition, a supporting mechanism (not shown) supports the primary units 1i a and 1b so that the primary units 1a and 1b can be freely moved.

In the embodiments described heretofore, it is possible to detect a mutual position relation between the primary unit 1 and the secondary unit 101 and control the magnetizations of the coils 4u, 4v and 4w based on the above mutual position relation. In this case, the linear motor can be used as a servo motor. In order to reduce a cogging force, the secondary core 103 and the permanent magnet 104 must be arranged in a manner similar to skewed slots of a general motor. More specifically, the secondary cores 103 and the permanent magnets 104 must be arranged along a direction not perpendicular to but skew to the moving direction of the primary unit 1 or the secondary unit 101.

According to the first embodiment, it is possible to unlimitedly enlarge the height of each permanent magnet along a direction perpendicular to the plane of the primary unit for generating the magnetic field. Therefore, it is possible to increase the magnetic flux density even if the ferrite magnet having a low price is applied to each permanent magnet. In addition, the magnetic fluxes generated in the primary unit can pass through each core of the secondary unit. Therefore, it is possible to prevent the permanent magnets from being demagnetized even if the rush currents are supplied to the primary unit at the starting timing.

[B] SECOND EMBODIMENT

Figure 7:
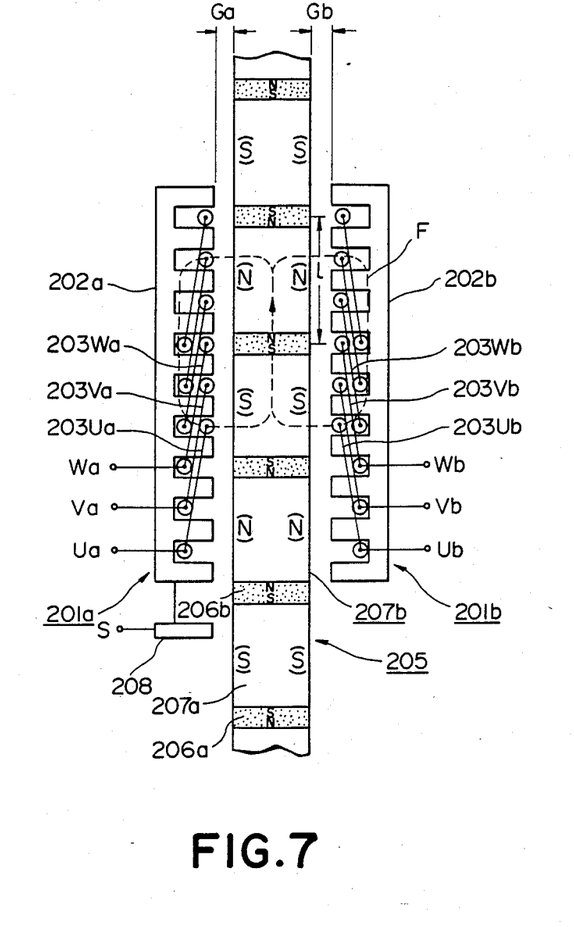
FIG. 7 is a sectional view showing a transporting apparatus to a second embodiment of the present invention.
Figure 8:
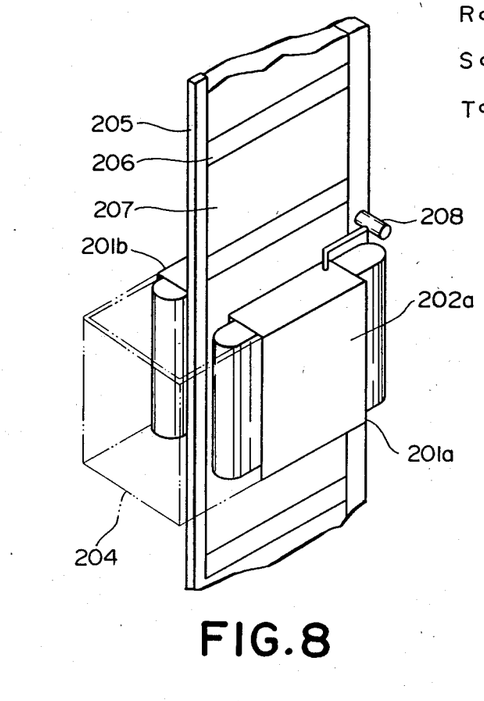
FIG. 8 is a perspective side view of the second embodiment.

Next, description will be given with respect to a second embodiment of the present invention in conjunction with FIGS. 7 to 12. FIG. 7 is a sectional view showing a second embodiment of the present invention, and FIG. 8 is a perspective side view showing the construction of this second embodiment. In FIGS. 7 and 8, 201a and 201b designate primary units of the linear motor which constitute a transporting truck. These primary units 201a and 201b consist of cores 202a and 202b coils 203Ua, 203Va and 203Wa and coils 203Ub, 203Vb and 203Wb respectively. Each of cores 202a and 202b has a layer construction which is constructed by a plurality of comb-type thin iron plates. In addition, the above coils are winding around teeth of the cores 202a and 202b. The coils 203Ua to 203Wa and the coils 203Ub to 203Wb are respectively supplied with the three-phase alternating currents, so that each of the primary units 201a and 201b generates the progressive magnetic field. Such primary units 201a and 201b are linked together by use of a U-shaped linking member 204 shown by dashed lines in FIG. 8.

Meanwhile, both mutually opposite planes of a secondary unit 205 face the primary units 201a and 201b, so that the secondary unit 205 can be influenced by the progressive magnetic field generated by each of the primary units 201a - and 201b. This secondary unit 205 forms the three-dimensional transporting lines including vertical transporting lines as shown in FIGS. 7 and 8. Such secondary unit 205 is constructed by alternatively linking a plurality of plate-shaped permanent magnets 206a, 206b, ... and square bar shaped cores 207a, 207b, ... in turn. In addition, the core 207a is sandwiched between the same S poles of the permanent magnets 206a and 206b. The planes of the cores 207 facing the primary units 201a and 201b are magnetized in the N pole and the S pole in turn. Hence, the secondary unit 205 generates magnetic fluxes in a direction F. Each pitch 1 of each pole within the secondary unit 205 is set equal to the half wavelength of the progressive magnetic field generated by each of the primary units 201a and 201b. A gap sensor 208 detects a gap between the primary unit 201a and the secondary unit 205 so as to output a detection signal S. As such gap sensor 208, a capacitance type sensor or an electromagnetic type sensor can be employed.

Figure 9:
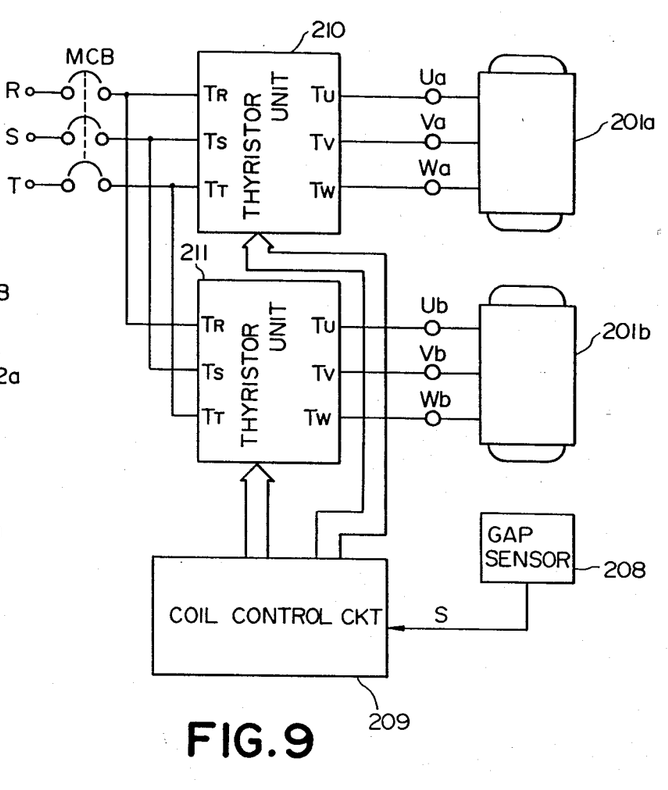
FIG. 9 is a block diagram showing the second embodiment.
Figures 10, 11:
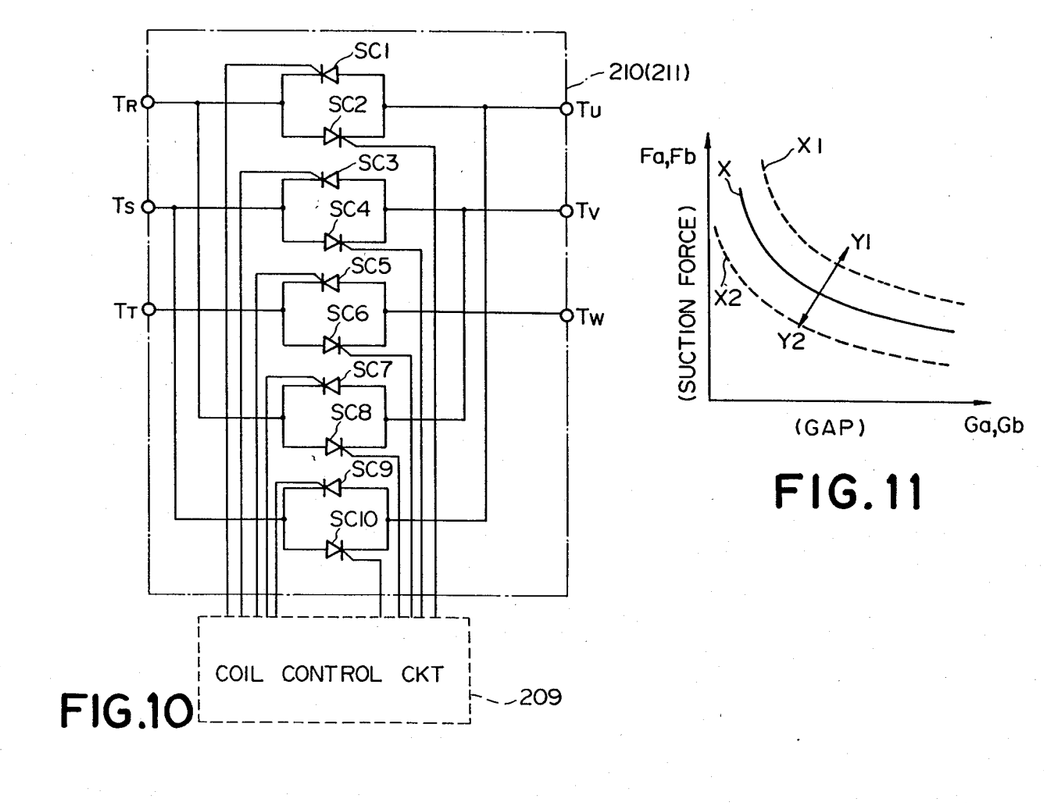
FIG. 10 is a circuit diagram showing an essential part of the second embodiment.
FIG. 11 is a graph showing a relation between a suction force of the linear motor according to the second embodiment and a gap between the primary and secondary units thereof.

Next, FIG. 9 is a block diagram showing an electric constitution of the second embodiment. In FIG. 9, the three-phased alternating currents applied to terminals R, S and T are supplied to respective terminals $T_R$, $T_S$ and $T_T$ of each of thyristor units 210 and 211 via a non-fuse breaker MCB. These thyristor units 210 and 211 have the same circuit constitution, and each thyristor unit consists of ten thyristors SC1 to SC10 as shown in FIG. 10. Each two thyristors among the thyristors SC1 to SC10 are connected in parallel but in an inverse direction. Output terminals Tu, Tv and Tw of the thyristor unit 210 are respectively connected to coil terminals Ua, Va and Wa of the primary unit 201a. Similarly, output terminals Tu, Tv and Tw of the thyristor unit 211 are respectively connected to coil terminals Ub, Vb and Wb of the primary unit 201b. Gates of the thyristors SC1 to SC10 of each thyristor unit are connected to a coil control circuit 209. This coil control circuit 209 performs a phase control on the thyristors SC1 to SC10 based on the detection signal S outputted from the gap sensor 208.

In the second embodiment as described heretofore, when the transporting truck is transported upward, the coil control circuit 209 controls the phases of thyristors SC1 to SC6 but other thyristors SC7 to SC10 are turned off. On the other hand, when the transporting truck is transported downward, the coil control circuit 209 controls the phases of the thyristors SC5 to SC10 but other thyristors SC1 to SC4 are turned off. Therefore, the suitable currents are respectively supplied to the coil terminals Ua to Wa of the primary unit 201a and the coil terminals Ub to Wb of the primary unit 201b based on on/off states of the thyristors SC1 to SC10, whereby the primary units 201a and 201b generate the respective progressive magnetic fields.

In the above-mentioned case, a suction force Fa works between the primary unit 201a and the secondary unit 205, and another suction force Fb works between the primary unit 201b and the secondary unit 205. A relation between the suction force Fa and the gap Ga has a curve X shown in FIG. 11. In other words, the suction force Fa is inversely proportional to the gap Ga. Such curve X moves to a dotted curve X1 in a direction Y1 when the currents supplied to the coil terminals Ua to Wa become larger. On the contrary, the curve X moves to a dotted curve X2 in a direction Y2 when the currents supplied to the coil terminals Ua to Wa become smaller. Same things can be said to the relation between the suction force Fb and the gap Gb. Thus, the gaps Ga and Gb vary in response to the currents supplied to the coil terminals Ua to Wa and the coil terminals Ub to Wb.

The above second embodiment detects one gap of the primary units 201a and 201b which are linked together.

More specifically, the gap sensor 208 detects the gap Ga formed between the primary unit 201a and the secondary unit 205 so as to generate and output the detection signal S to the coil control circuit 209. Hence, the coil control circuit 209 controls the phases of the thyristors SC1 to SC10 of each thyristor unit and also controls the currents supplied to the coil terminals Ua to Wa and Ub to Wb so that the gap Ga can be equal to the gap Gb.

Incidentally, when positions of the primary units 201a and 201b are deviated in a width direction of the secondary unit 205, the suction forces Fa and Fb work to eliminate such deviations. In the case where the positions of the primary units 201a and 201b are deviated in a longitudinal direction of the secondary unit 205, it is possible to prevent such deviations from being caused by use of techniques used in a conventional magnetic flotation technique. For example, it is possible to eliminate such deviation by providing a guide coil at a side edge portion of the secondary unit 205.

Figure 12:
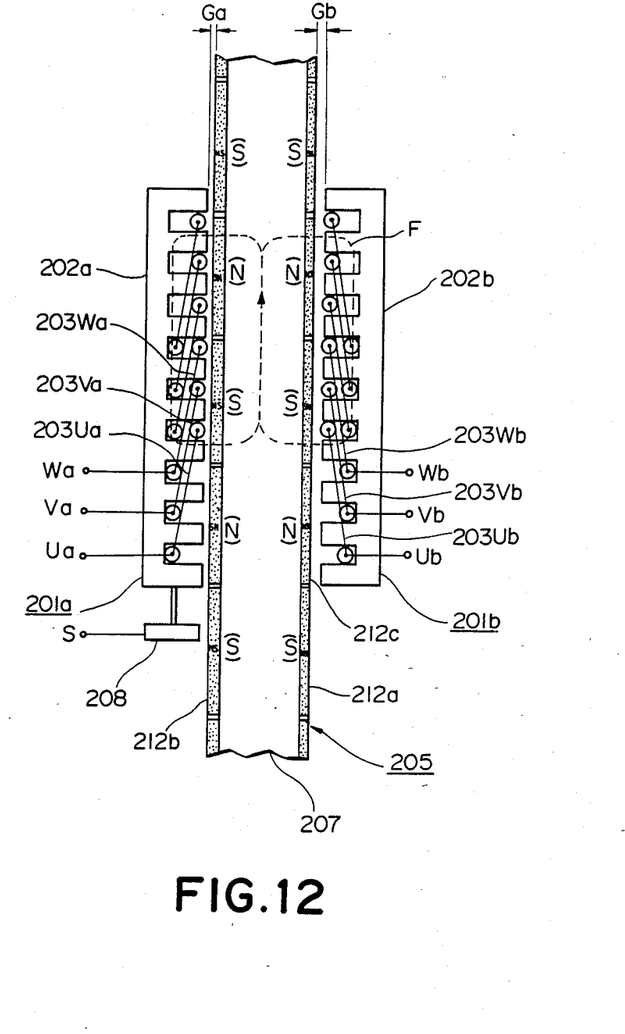
FIG. 12 is a sectional view showing another example of the second embodiment shown in FIG. 7.

In the second embodiment, the secondary unit 205 of the linear motor consists of a plurality of the plate-shaped permanent magnets 206a, 206b, ... and the square bar shaped cores 207a, 207b, ... which are arranged in turn. However, it is possible to re-construct the second embodiment so that a plurality of permanent magnets 212a to 212c etc. can be respectively arranged at both sides of the long core 207 as shown in FIG. 12.

Above is the description of the preferred embodiments according to the present invention. This invention may be practiced or embodied in still other ways without departing from the spirit or essential character thereof. Therefore, the preferred embodiments described herein are illustrative and not restrictive, the scope of the invention being indicated by the appended claims and all variations which come within the meaning of the claims are intended to be embraced therein.

What is claimed is:

1. A transporting apparatus using a linear motor comprising:
   (a) a primary unit for generating a progressive magnetic field; and
   (b) a secondary unit having a predetermined plane which faces a plane of said progressive magnetic field with a certain gap,
       said secondary unit comprising a plurality of permanent magnets and cores which arranged in turn along a progressing direction of said progressive magnetic field so that a said core is disposed between adjacent permanent magnets, and
       said permanent magnets being magnetized such that poles of adjacent permanent magnets are in facing relation to one another,
       said poles in facing relation having the same polarity so that a core disposed therebetween is magnetized as said polarity, whereby planes of said cores facing said plane of said progressive magnetic field are magnetized in a north pole and a south pole in turn.

2. A transporting apparatus using a linear motor comprising:
   (a) a pair of primary units each generating a progressive magnetic field; and
   (b) a secondary unit inserted between said primary units with certain gaps such that a predetermined plane of said secondary unit faces a plane of said progressive magnetic field generated by each primary unit with said certain gap,
       said secondary unit comprising a plurality of permanent magnets and cores which are arranged in turn along a progressing direction of said progressive magnetic field so that a said core is dispensed between adjacent permanent magnets, and
       said permanent magnets being magnetized such that poles of adjacent permanent magnets are in facing relation to one another,
       said poles in facing relation having the same polarity so that a core disposed therebetween is magnetized as said polarity, whereby planes of said cores facing plane of said progressive magnetic field are magnetized in a north pole and a south pole in turn.

3. A transporting apparatus according to claim 1 or 2, wherein said primary unit comprises
   (a) a comb-type core and
   (b) three coils winding of channels of said comb-type core at a predetermined order, said coils being supplied with three-phase alternating currents so that said progressive magnetic field will be generated.

4. A transporting apparatus according to claim 1 or 2, wherein a width of one pair of said permanent magnet and said core is set identical to a half wavelength of said progressive magnetic field.

5. A transporting apparatus comprising:
   (a) a secondary unit of a linear motor, said secondary unit comprising a plurality of permanent magnets and cores which are arranged in turn along a longitudinal direction thereof so that a said core is disposed between adjacent permanent magnets, said permanent magnets being magnetized such that poles of adjacent permanent magnets are in facing relation, said poles in facing relation having the same plurality so that a core disposed therebetween is magnetized as said polarity, whereby said cores are magnetized in a north pole and a south pole in turn, said linear motor having three-dimensional transporting lines including vertical lines;
   (b) first and second primary units of said linear motor, each of first and second primary units comprising a core and coils winding around said core, said secondary unit being inserted between said first and second primary units so that said core of said first primary unit is arranged opposite to that of said second primary unit with said secondary unit, said first and second primary units being linked together so as to construct a transporting truck of said linear motor;
   (c) gap detecting means for detecting first and second gaps each formed between said secondary unit and each of said first and secondary primary units; and
   (d) control means for controlling currents supplied to said coils of said first and second primary units so that said first gap is maintained identical to said second gap.

6. A transporting apparatus according to claim 5, wherein said coils of each primary unit are supplied with three-phase alternating currents so that said each primary unit generates a progressive magnetic field, whereby said transporting truck of said linear motor is transported in a desirable direction.

7. A transporting apparatus according to claim 5, wherein said secondary unit comprises a plurality of permanent magnets and cores, said permanent magnets and cores being arranged in turn along a longitudinal direction of said secondary unit, and said permanent magnets being magnetized so that planes of said cores facing each primary unit are magnetized in a north pole and a south pole in turn.

8. A transporting apparatus according to claim 5, wherein said control means comprises (a) first and second thyristor units each including a plurality of thyristors, said first and second thyristor units being supplied with three-phase alternating currents; and (b) a control circuit for controlling on/off states and phases of said thyristors within each thyristor unit so that output currents of each thyristor unit are controlled, said output currents of said first and second thyristor units being respectively supplied to said coils of said first and second primary units.

* * * * *